(12) United States Patent
Liu

(10) Patent No.: US 12,323,261 B2
(45) Date of Patent: Jun. 3, 2025

(54) METHOD AND APPARATUS FOR SETTING A PARAMETER OF A MULTIMEDIA CONFERENCE

(71) Applicant: Beijing Zitiao Network Technology Co., Ltd., Beijing (CN)

(72) Inventor: Zhaoyi Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/796,326

(22) Filed: Aug. 7, 2024

(65) Prior Publication Data

US 2024/0396757 A1 Nov. 28, 2024

Related U.S. Application Data

(63) Continuation of application No. PCT/CN2023/072485, filed on Jan. 17, 2023.

(30) Foreign Application Priority Data

Feb. 7, 2022 (CN) .......................... 202210116434.2

(51) Int. Cl.
*H04L 12/18* (2006.01)
(52) U.S. Cl.
CPC ................. *H04L 12/1818* (2013.01)
(58) Field of Classification Search
CPC .. G06F 21/30; G06F 3/0481; G06F 221/2141; G06F 16/44; G06Q 10/109;
(Continued)

(56) References Cited

U.S. PATENT DOCUMENTS

2008/0043644 A1 2/2008 Barkley et al.
2014/0095629 A1* 4/2014 Brown ............... G06Q 10/1093
715/764
2020/0341625 A1* 10/2020 Roedel .................. H04N 7/147

FOREIGN PATENT DOCUMENTS

CN 111931962 A 11/2020
CN 112818303 A * 5/2021 ............. G06F 21/30
(Continued)

OTHER PUBLICATIONS

International Patent Application No. PCT/CN2023/072485; Int'l Search Report; dated May 17, 2023; 2 pages.
(Continued)

*Primary Examiner* — Maria El-Zoobi
(74) *Attorney, Agent, or Firm* — BakerHostetler

(57) ABSTRACT

The application discloses a method of setting a parameter of a multimedia conference. A client may, in response to a multimedia conference setting operation triggered by a user within a first schedule editing interface, obtain a first conference link of the multimedia conference and present a first setting page within the first schedule editing interface, the multimedia conference being a multimedia conference associated with a schedule corresponding to the first schedule editing interface, and the first setting page being for setting a parameter of the multimedia conference, the first schedule editing interface being an editing interface related to a schedule. Then, the client may obtain a first multimedia conference parameter input by the user within the first setting page, and in response to a saving operation triggered by the user within the first setting page, save the first multimedia conference parameter in association with the first conference link.

20 Claims, 4 Drawing Sheets

(58) Field of Classification Search
CPC ..... G06Q 10/02; H04L 12/18; H04L 12/1818; H04M 1/72451
USPC ..................................................... 348/14.02
See application file for complete search history.

(56) References Cited

FOREIGN PATENT DOCUMENTS

| | | |
|---|---|---|
| CN | 113824572 A | 12/2021 |
| CN | 114489908 A | 5/2022 |

OTHER PUBLICATIONS

China Patent Application No. 202210116434.2; Office Action; dated Jun. 21, 2023; 13 pages.
"How to set the period of Tencent Meeting?"; https://www.zhihu.com/question/450247225/answer/2136698060; Zhihu; Sep. 2021; accessed Aug. 6, 2024; 2 pages.

\* cited by examiner

METHOD AND APPARATUS FOR SETTING A PARAMETER OF A MULTIMEDIA CONFERENCE

CROSS-REFERENCE TO RELATED APPLICATION

This application is a continuation of International Patent Application No. PCT/CN2023/072485, filed on Jan. 17, 2023, which claims priority to CN Patent Application No. 202210116434.2, filed on Feb. 7, 2022, both of which are incorporated herein by reference in their entireties.

FIELD

The present application relates to the field of computer technologies, and more particularly, to a method and apparatus for setting a parameter of a multimedia conference.

BACKGROUND

Some applications may provide the function of creating schedules, which makes it easier for users to work on a schedule. By creating a schedule, other users can be invited to participate in this schedule. For a schedule, this schedule may be configured with a corresponding multimedia conference, so that participants of the schedule may discuss work items corresponding to this schedule together through the multimedia conference.

The user may set parameters of the multimedia conference associated with this schedule. At present, the operation of the user to set the parameters is more cumbersome, resulting in inefficient setting of the parameters.

Therefore, there is an urgent need for a solution that can improve the efficiency of setting a parameter of a multimedia conference.

SUMMARY

The technical problem to be solved in the present application is how to improve the efficiency of setting a parameter of a multimedia conference and provide a method and apparatus for setting a parameter of a multimedia conference.

In a first aspect, embodiments of the present disclosure provide a method of setting a parameter of a multimedia conference, comprising: in response to a multimedia conference setting operation triggered by a user within a first schedule editing interface, obtaining a first conference link of the multimedia conference and presenting a first setting page within the first schedule editing interface, the multimedia conference being a multimedia conference associated with a schedule corresponding to the first schedule editing interface, and the first setting page being for setting a parameter of the multimedia conference, the first schedule editing interface being an editing interface related to a schedule; obtaining a first multimedia conference parameter input by the user within the first setting page; and in response to a saving operation triggered by the user within the first setting page, saving the first multimedia conference parameter in association with the first conference link.

Optionally, in response to the multimedia conference setting operation, obtaining a first conference link of the multimedia conference comprises: in response to the multimedia conference setting operation, sending, by a schedule module, a conference link assignment request to a multimedia conference module; and obtaining the first conference link assigned by the multimedia conference module to the multimedia conference.

Optionally, the method further comprises: presenting a second setting page in response to a multimedia conference setting operation triggered by the user for a created schedule, the second setting page comprising the first multimedia conference parameter, the created schedule being a schedule corresponding to the first schedule editing page; obtaining a modified parameter in response to a modification operation triggered by the user for at least one parameter of the first multimedia conference parameter that is presented within the second setting page; and in response to a saving operation triggered by the user within the second setting page, saving a second multimedia conference parameter and the first conference link in association, the second multimedia conference parameter comprising the modified parameter, and an unmodified parameter in the first multimedia conference parameter.

Optionally, a schedule corresponding to the first schedule editing interface is a periodic schedule, the method further comprising: obtaining a second conference link of a multimedia conference associated with a first schedule, in response to a parameter of the first schedule in the periodic schedule being modified, and a multimedia conference parameter associated with the first schedule being unmodified; obtaining a multimedia conference parameter corresponding to a second schedule in the periodic schedule, the second schedule being any one of periodic schedules whose schedule parameter is unmodified; and saving the second conference link in association with the multimedia conference parameter corresponding to the second schedule.

Optionally, the multimedia conference parameter corresponding to the second schedule is the first multimedia conference parameter.

Optionally, the method further comprises: in response to the modification to the parameter of the first schedule being effective on at least one third schedule in the periodic schedule, saving the second conference link and the multimedia conference parameter corresponding to the second schedule as a multimedia conference link and a multimedia conference parameter of the at least one third schedule.

Optionally, the method further comprises: in response to the modification to the parameter of the first schedule being applicable only to the first schedule, remaining multimedia conference parameters and multimedia conference links of further schedules in the periodic schedule other than the first schedule unchanged.

Optionally, the modified parameter of the first schedule comprises: a schedule participant of the first schedule.

Optionally, a schedule corresponding to the first schedule editing interface is a periodic schedule, the method further comprising: in response to a multimedia conference setting operation triggered by a user within a second schedule editing interface, obtaining a third conference link and presenting a third setting page within the second schedule editing interface, wherein the second schedule editing interface is an editing interface of a fourth schedule in the periodic schedule, the user modifying a parameter of the fourth schedule via the second schedule editing interface, the third conference link being a link of a multimedia conference associated with the fourth schedule; obtaining a third multimedia conference parameter input by the user within the third setting page; and in response to a saving operation triggered by the user within the third setting page, saving the third multimedia conference parameter in association with the third conference link.

Optionally, the method further comprises: in response to the modification to the parameter of the fourth schedule being effective on at least one fifth schedule in the periodic schedule, saving the third multimedia conference parameter and the third conference link as a multimedia conference parameter and a multimedia conference link of the at least one fifth schedule in association.

Optionally, the method further comprises: in response to the modification to the parameter of the fourth schedule being applicable only to the fourth schedule, remaining multimedia conference parameters and multimedia conference links of further schedules in the periodic schedule other than the fourth schedule unchanged.

Optionally, the first schedule editing interface is for creating a schedule, or the first schedule editing interface is an editing interface for a created schedule.

Optionally, the method further comprises: presenting, within a schedule interface, schedule information that has been edited and completed within the first schedule editing interface.

In a second aspect, embodiments of the present disclosure provide an apparatus for setting a parameter of a multimedia conference, comprising: a first obtaining unit configured to, in response to a multimedia conference setting operation triggered by a user within a first schedule editing interface, obtain a first conference link of a multimedia conference; a first presenting unit configured to, in response to the multimedia conference setting operation, present a first setting page within the first schedule editing interface, the multimedia conference being a multimedia conference associated with the schedule corresponding to the first schedule editing interface, and the first setting page being for setting a parameter of the multimedia conference, the first schedule editing interface being an editing interface related to a schedule; a second obtaining unit configured to obtain a first multimedia conference parameter input by the user within the first setting page; and a first saving unit configured to, in response to a saving operation triggered by the user within the first setting page, save the first multimedia conference parameter in association with the first conference link in association.

Optionally, the first obtaining unit is configured to: in response to the multimedia conference setting operation, send, by a schedule module, a conference link assignment request to a multimedia conference module; and obtain the first conference link assigned by the multimedia conference module to the multimedia conference.

Optionally, the apparatus further comprises: a second presenting unit configured to present a second setting page in response to a multimedia conference setting operation triggered by the user for a created schedule, the second setting page comprising the first multimedia conference parameter, the created schedule being a schedule corresponding to the first schedule editing page; a third obtaining unit configured to obtain a modified parameter in response to a modification operation triggered by the user for at least one parameter of the first multimedia conference parameter that is presented within the second setting page; and a second saving unit configured to, in response to a saving operation triggered by the user within the second setting page, save a second multimedia conference parameter and the first conference link in association, the second multimedia conference parameter comprising the modified parameter, and an unmodified parameter in the first multimedia conference parameter.

Optionally, a schedule corresponding to the first schedule editing interface is a periodic schedule, the apparatus further comprising: a fourth obtaining unit configured to obtain a second conference link of a multimedia conference associated with a first schedule, in response to a parameter of the first schedule in the periodic schedule being modified, and a multimedia conference parameter associated with the first schedule being unmodified; a fifth obtaining unit configured to obtain a multimedia conference parameter corresponding to a second schedule in the periodic schedule, the second schedule being any one of periodic schedules whose schedule parameter is unmodified; and a third saving unit configured to save the second conference link in association with the multimedia conference parameter corresponding to the second schedule.

Optionally, the multimedia conference parameter corresponding to the second schedule is the first multimedia conference parameter.

Optionally, the apparatus further comprises: a fourth saving unit configured to, in response to the modification to the parameter of the first schedule being effective on at least one third schedule in the periodic schedule, save the second conference link and the multimedia conference parameter corresponding to the second schedule as a multimedia conference link and a multimedia conference parameter of the at least one third schedule.

Optionally, the apparatus further comprises: a first remaining unit configured to, in response to the modification to the parameter of the first schedule being applicable only to the first schedule, remain multimedia conference parameters and multimedia conference links of further schedules in the periodic schedule other than the first schedule unchanged.

Optionally, the modified parameter of the first schedule comprises: a schedule participant of the first schedule.

Optionally, a schedule corresponding to the first schedule editing interface is a periodic schedule, the apparatus further comprising: a sixth obtaining unit configured to, in response to a multimedia conference setting operation triggered by a user within a second schedule editing interface, obtain a third conference link; a third presenting unit configured to, in response to a multimedia conference setting operation triggered by a user within a second schedule editing interface, present a third setting page within the second schedule editing interface, wherein the second schedule editing interface is an editing interface of a fourth schedule in the periodic schedule, the user modifying a parameter of the fourth schedule via the second schedule editing interface, the third conference link being a link of a multimedia conference associated with the fourth schedule; a seventh obtaining unit configured to obtain a third multimedia conference parameter input by the user within the third setting page; and a fifth saving unit configured to, in response to a saving operation triggered by the user within the third setting page, save the third multimedia conference parameter in association with the third conference link.

Optionally, the apparatus further comprises: a sixth saving unit configured to, in response to the modification to the parameter of the fourth schedule being effective on at least one fifth schedule in the periodic schedule, save the third multimedia conference parameter and the third conference link as a multimedia conference parameter and a multimedia conference link of the at least one fifth schedule in association.

Optionally, the apparatus further comprises: a second remaining unit configured to, in response to the modification to the parameter of the fourth schedule being applicable only to the fourth schedule, remain multimedia conference parameters and multimedia conference links of further schedules in the periodic schedule other than the fourth schedule unchanged.

Optionally, the first schedule editing interface is for creating a schedule, or the first schedule editing interface is an editing interface for a created schedule.

Optionally, the apparatus further comprises: a fourth presenting unit configured to present, within a schedule interface, schedule information that has been edited and completed within the first schedule editing interface.

In a third aspect, embodiments of the present disclosure provide a device, comprising a processor and a memory; the processor being configured to execute instructions stored in the memory, causing the device to implement the method described in any of the above first aspects.

In a fourth aspect, embodiments of the present disclosure provide a computer-readable storage medium, comprising instructions, the instruction instructing a device to implement the method described in any of the above first aspects.

In a fifth aspect, embodiments of the present disclosure provide a computer program product, wherein the computer program product, when executed on a computer, causes a computer to implement the method described in any of the above first aspects.

Compared with the prior art, embodiments of the present application have the following advantages.

An embodiment of the present application provides a method of setting a parameter of a multimedia conference. The method may be executed by a client. In one example, the user may trigger a multimedia conference setting operation within a first schedule editing interface, and the client, in response to a multimedia conference setting operation triggered by a user within a first schedule editing interface, may obtain a first conference link of the multimedia conference and present a first setting page within the first schedule editing interface, the multimedia conference being a multimedia conference associated with a schedule corresponding to the first schedule editing interface, and the first setting page being for setting a parameter of the multimedia conference, the first schedule editing interface being an editing interface related to a schedule. Then, the client may obtain a first multimedia conference parameter input by the user within the first setting page, and in response to a saving operation triggered by the user within the first setting page, save the first multimedia conference parameter in association with the first conference link. It can thus be seen that, by using the solutions of the embodiments of the present application, the user may trigger the multimedia conference setting operation within the first schedule editing interface, such that a parameter of the multimedia conference is set. In other words, the user can trigger the setting of the parameter of the multimedia conference while editing relevant information of the schedule, without triggering the multimedia conference setting operation through other pages after the editing of schedule information, which effectively simplifies the parameter setting process of the multimedia conference, thereby improving the efficiency of setting the parameter of the multimedia conference.

BRIEF DESCRIPTION OF THE DRAWINGS

To describe the embodiments of the present application or the technical solutions in the prior art more clearly, the following briefly introduces the accompanying drawings required for describing the embodiments or the descriptions in the prior art. Apparently, the accompanying drawings in the following description show merely some embodiments of the present application, and a person of ordinary skill in the art may still derive other drawings from these accompanying drawings without creative efforts.

DETAILED DESCRIPTION

In order for those skilled in the art to understand the solutions of the present application better, the technical solutions in the embodiments of the present application will be described clearly and completely in conjunction with the accompanying drawings in the embodiments of the present application. Apparently, the described embodiments are merely some embodiments of the present application, rather than all embodiments. Based on the embodiments of the present application, all other embodiments derived by a person of ordinary skill in the art without creative efforts shall fall within the protection scope of the present application.

The inventors of the present application have found that, because schedule creation and a multimedia conference belong to two independent program modules, in the related products, the operation of a user to set a parameter of a multimedia conference associated with a schedule is cumbersome: in general cases, the schedule needs to be created first, and then the associated multimedia conference is configured. For example, the user creates the schedule first, and then finds a schedule page of this schedule after this schedule is created. This schedule page has an entry for setting the parameter of the multimedia conference associated with the schedule, and the user triggers the setting of the parameter of the multimedia conference through this entry.

Since the multimedia conference is associated with the schedule, the user may have both the need to edit schedule information and the need to set the parameter of the multimedia conference. If the setting of the parameter of the multimedia conference can be triggered while relevant information of the schedules is edited, the parameter setting process of the multimedia conference can be effectively simplified, thereby improving the efficiency of setting the parameter of the multimedia conference.

In view of this, an embodiment of the present application provides a method of setting a parameter of a multimedia conference, which can trigger the setting of a parameter of the multimedia conference within a schedule editing interface, thereby improving the efficiency of setting the parameter of the multimedia conference.

Various non-restrictive embodiments of the present application are described in detail below in conjunction with the accompanying drawings.

Exemplary Method

Figure 1:
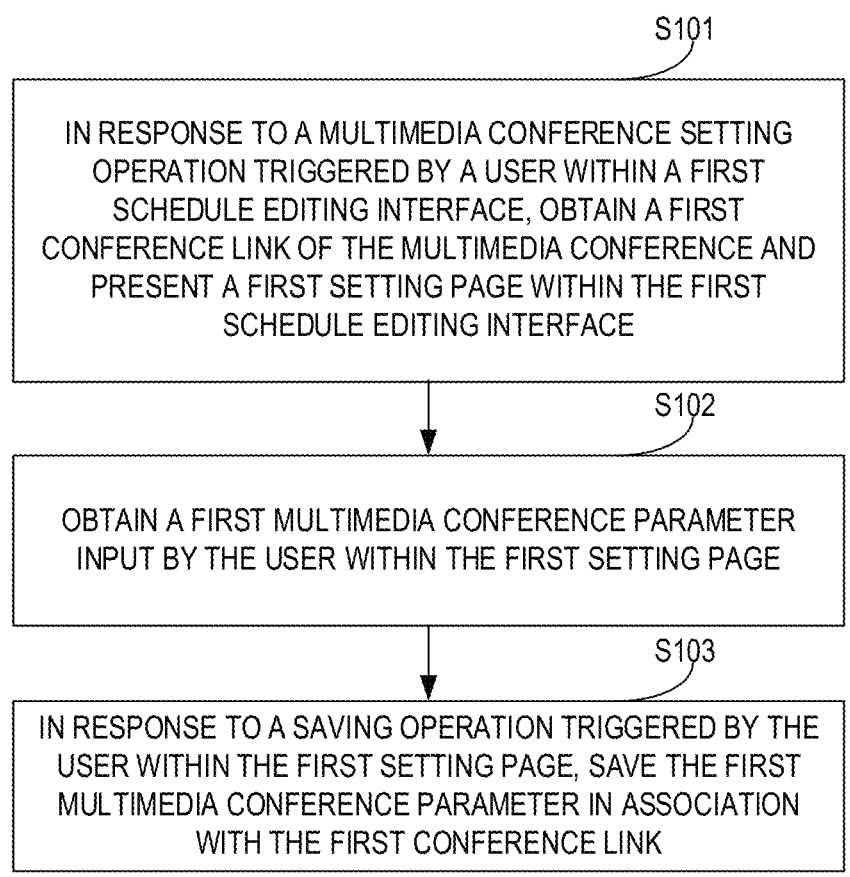
FIG. 1 is a schematic flowchart of a method of setting a parameter of a multimedia conference according to an embodiment of the present application.

Referring to FIG. 1, FIG. 1 is a schematic flowchart of a method of setting a parameter of a multimedia conference according to an embodiment of the present application. In this embodiment, the method may be executed by a client. For example, the method may comprise the following steps: S101-S103.

In S101, in response to a multimedia conference setting operation triggered by a user within a first schedule editing interface, a first conference link of the multimedia conference is obtained, and a first setting page is presented within the first schedule editing interface.

The first schedule editing interface is an editing interface related to a schedule. The user may edit schedule information, for example, a name of the schedule, participants of the schedule, occurrence time of the schedule and the like, within the first schedule editing interface.

In one example, the first schedule editing interface is configured to create a schedule. For example, a user may edit schedule information of the created schedule through the first schedule editing interface after triggering the operation of creating the schedule. In another example, the first schedule editing interface is an editing interface of the created schedule. In this case, the user may modify the schedule information of the created schedule through the first schedule editing interface. The schedule information mentioned herein comprises, but is not limited to, a name of the schedule, participants of the schedule, occurrence time of the schedule, and the like.

In the embodiments of the present application, in addition to editing the schedule information within the first schedule editing interface, the user may also trigger a multimedia conference setting operation on the schedule editing interface. For example, the first schedule editing interface may comprise a first control. The first control is configured to trigger the multimedia conference setting operation. The user may trigger the multimedia conference setting operation by using the first control (e.g., clicking the first control).

Figure 2:
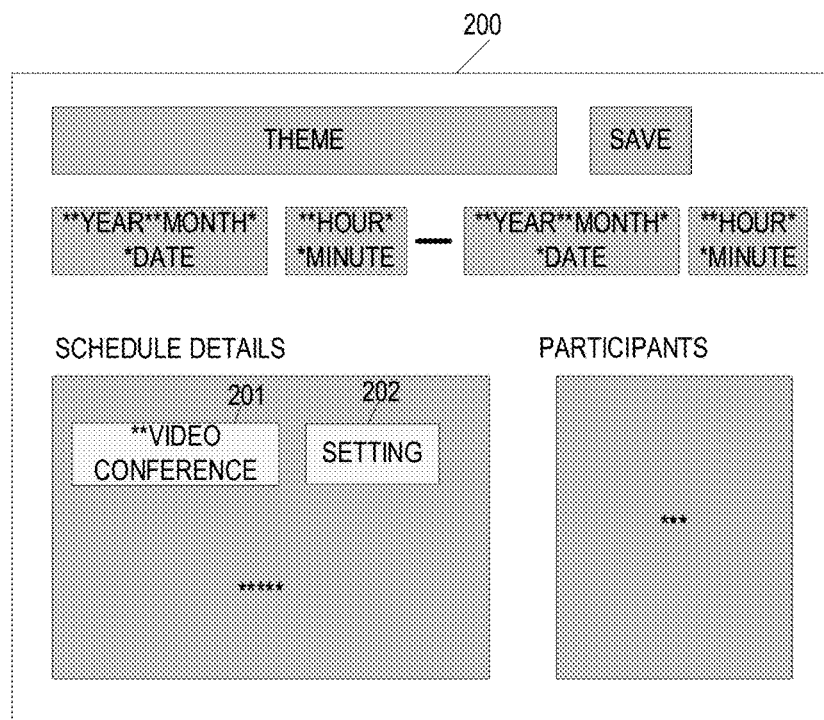
FIG. 2 is a schematic diagram of a first schedule editing interface according to an embodiment of the present application.

A description is made now in conjunction with FIG. 2. FIG. 2 is a schematic diagram of a first schedule editing interface according to an embodiment of the present application. As shown in FIG. 2, 201 within the first schedule editing interface 200 indicates that a schedule corresponding to the first schedule editing interface has an associated multimedia conference, and the user may click 202 (corresponding to the first control) within the first schedule editing interface 200, thereby triggering the multimedia conference setting operation.

Other content in schedule details, such as a corresponding conference room and a schedule reminding mode, may, for example, be denoted by "*****" in an area of "Schedule Details" indicated in FIG. 2. In addition, FIG. 2 is shown for ease of understanding only and does not constitute a limitation of the embodiments of the present application, and the content of the first schedule editing interface is not limited to those shown in FIG. 2.

In the embodiments of the present application, after the user triggers the multimedia conference setting operation within the first schedule editing interface, the client may, in response to a multimedia conference setting operation triggered by a user within a first schedule editing interface, obtain a first conference link of the multimedia conference.

In one example, the client may comprise a schedule module and a multimedia conference module, wherein the schedule module is configured to process information related to a schedule, and the multimedia conference module is configured to process information related to the multimedia conference. The first conference link may be assigned by the multimedia conference module. A schedule participant may initiate or enter a multimedia conference associated with this schedule by triggering the first conference link. In some embodiments, after the user triggers the multimedia conference setting operation within the first schedule editing interface, the schedule module may, in response to the multimedia conference setting operation, send a conference link assignment request to the multimedia conference module, and then the multimedia conference module assigns the first conference link.

In another example, the first conference link may be sent by a server to the client. In some embodiments, the client and the server each comprise a scheduling module and a multimedia conference module. After the user triggers the multimedia conference setting operation within the first schedule editing interface, the schedule module of the client may, in response to the multimedia conference setting operation, send the conference link assignment request to the multimedia conference module of the server; and then, the multimedia conference module of the server assigns the first conference link and sends the first conference link to the client.

Figure 3:
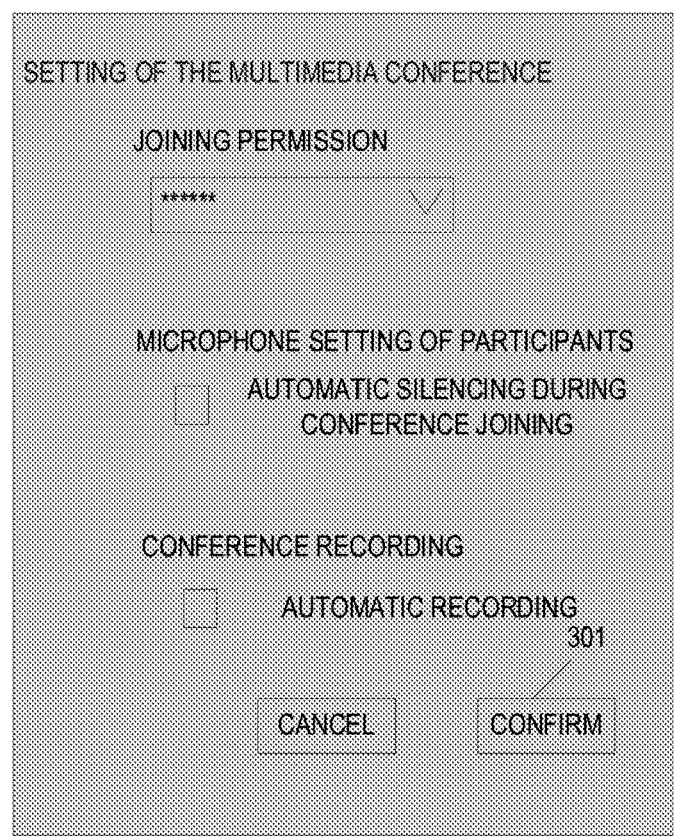
FIG. 3 is a schematic diagram of a first setting page according to an embodiment of the present application.

In addition, after the user triggers the multimedia conference setting operation within the first schedule editing interface, the client may also, in response to the multimedia conference setting operation, present a first setting page within the first schedule editing interface. The first setting page is configured to set the parameter of the multimedia conference. The first setting page may be understood with reference to FIG. 3. FIG. 3 is a schematic diagram of a first setting page according to an embodiment of the present application. As shown in FIG. 3, the user may add one or more of parameters such as a permission to join the multimedia conference (joining permission), microphone settings of participants, and conference recording through the first setting page shown in FIG. 3. FIG. 3 is shown for ease of understanding only and does not constitute a limitation of the embodiments of the present application, and the content of the first setting page is not limited to those shown in FIG. 3.

In S102, a first multimedia conference parameter input by the user within the first setting page is obtained.

After the client presents the first settings page, the user may set the parameter of the multimedia conference through the first setting page. In one example, the user may input the first multimedia conference parameter within the first setting page, and the first multimedia conference parameter may comprise at least one parameter. The first multimedia conference parameter are not specifically limited in the embodiments of the present application. For example, the first multimedia conference parameter may comprise one or more parameters as shown in FIG. 3, such as a permission to join the multimedia conference, microphone settings of participants, and conference recording.

In S103, in response to a saving operation triggered by the user within the first setting page, the first multimedia conference parameter is saved in association with the first conference link.

After completing the input of the first multimedia conference parameter within the first setting page, the user may trigger the saving operation within the first setting page. For example, the user may click a second control configured to trigger the saving operation within the first setting page. For example, the second control mentioned herein may correspond to 301 shown in FIG. 3. After a first user triggers the saving operation within the first setting page, the client may, in response to the saving operation triggered by the user within the first setting page, save the first multimedia conference parameter in association with the first conference link. Herein, saving the first multimedia conference parameter in association with the first conference link refers to saving a corresponding relationship between the first multimedia conference parameter and the first conference link.

As can be seen from the above description, the user may trigger a multimedia conference operation within the first schedule editing interface with the solutions provided by the embodiments of the present application, so that the setting of the parameter of the multimedia conference associated with the schedule corresponding to the first schedule editing page is implemented. The user operation is simple, and correspondingly, the efficiency of setting the parameter of the multimedia conference can be improved.

As described above, the first schedule editing interface is an editing interface related to the schedule. The user may edit schedule information within the first schedule editing interface. In one example, after editing the schedule information within the first schedule editing interface, the user may trigger a saving operation within the first schedule editing interface. For example, within the first schedule editing interface shown in FIG. 2, the user may click a "Save" control shown in FIG. 2 after inputting the schedule information on a schedule adding page.

After the user triggers the saving operation triggered by the user within the first schedule editing interface, the client may, in response to the user triggering the saving operation within the first schedule editing interface, save the schedule information that has been edited and completed by the user within the first schedule editing interface. Further, the client may present, within a schedule interface, the schedule information that has been edited and completed within the first schedule editing interface.

The schedule interface is not specifically limited in the embodiments of the present application. In one example, each information in the edited schedule information may correspond to one display area within the schedule interface. The schedule interface may comprise a display area related to the multimedia conference. The display area may, for example, present the first conference link.

Regarding the saving of the edited schedule information, it should be noted that in addition to saving the schedule information at a client of a schedule creator of the first schedule, clients of other participants of the first schedule may also save the edited schedule information. In one example, the client of the schedule creator of the first schedule may send the edited schedule information to the server, and the server may send the edited schedule information to the clients of the other participants of the first schedule.

Correspondingly, calendar interfaces of the other participants may also present the edited schedule information.

The schedule creator of the first schedule may send schedule invitations to other users, and the users who accept the schedule invitations are the other participants of the first schedule. In addition, the parameter of the multimedia conference associated with the first schedule may also be effective on the other participants, and the clients of the other participants may save the parameter of the multimedia conference associated with the first schedule. In one example, after the user sets the first multimedia conference parameter, the first multimedia conference parameter need to be modified. In view of this, the method may further comprise the following steps A1-A3.

In A1, a second setting page is presented in response to a multimedia conference setting operation triggered by the user for a created schedule, the second setting page comprising the first multimedia conference parameter, the created schedule being a schedule corresponding to the first schedule editing page.

The created schedule mentioned herein may be a schedule corresponding to the first schedule editing interface. In one example, the created schedule may be a schedule created through the first schedule editing interface.

In one example, the user may trigger the multimedia conference setting operation within a schedule interface of the created schedule. For example, the schedule interface comprises schedule information of the created schedule and a third control configured to trigger the multimedia conference setting operation. The user may trigger the multimedia conference setting operation through a third control (e.g., clicking the third control).

In yet another example, the user may trigger the multimedia conference setting operation within a schedule editing interface of the created schedule. The specific content of the multimedia conference setting operation triggered by the user within the schedule editing interface of the created schedule may refer to the description part of the multimedia conference setting operation triggered by the user within the first schedule editing interface, which will not be repeated herein.

In the embodiments of the present application, after the user triggers the multimedia conference setting operation for the created schedule, the client may present a second setting page in response to the multimedia conference setting operation triggered by the user for the created schedule. The second setting page comprises the first multimedia conference parameter. The second setting page may refer to the first setting page shown in FIG. 3, which will not be explained in detail herein.

In A2, a modified parameter is obtained in response to a modification operation triggered by the user for at least one parameter of the first multimedia conference parameter that is presented within the second setting page.

In A3, in response to a saving operation triggered by the user within the second setting page, a second multimedia conference parameter and the first conference link are saved in association, the second multimedia conference parameter comprising the modified parameter, and an unmodified parameter in the first multimedia conference parameter.

After the client presents the second setting page, the user may modify at least one parameter of the first multimedia conference parameter according to the first multimedia conference parameter presented within the second setting page. Correspondingly, the client may obtain the modified parameters. After completing the modification, the user may trigger a saving operation (e.g., clicking a control configured to trigger the saving operation) within the second setting page. The client may, in response to the saving operation triggered by the user within the second setting page, save the second multimedia conference parameter and the first conference link in association. The second multimedia conference parameter comprise the modified parameter, and an unmodified parameter in the first multimedia conference parameter. Saving the second multimedia conference parameter and the first conference link in association refers to saving a corresponding relationship between the second multimedia conference parameter and the first conference link.

As described above, the first schedule editing interface is an editing interface related to a schedule. In one example, the schedule corresponding to the first schedule editing interface is a periodic schedule.

Regarding the periodic schedule, it should be noted that the so-called periodic schedule refers to a schedule that is repeated according to a certain period. The period of repeated execution of the periodic schedule is not specifically limited in the embodiments of the present application. For example, the period may be a natural day, a week, a month, and so on, which will not be enumerated herein. The user may set a schedule as the periodic schedule while creating the schedule. For a non-periodic schedule that has been created, the user may also modify the parameter of the created schedule, thereby modifying the non-periodic schedule to a periodic schedule.

In one example, when the schedule corresponding to the first schedule editing interface is the periodic schedule, the first conference link and the first multimedia conference parameter may be applicable to each of the periodic schedules.

In some embodiments, when the schedule corresponding to the first schedule editing interface is the periodic schedule, the user may modify the parameter of the first schedule in the periodic schedule. The modified parameter of the first schedule is not specifically limited in the embodiments of the present application. The modified parameter of the first schedule may be schedule participants of the first schedule, and the modified parameter of the first schedule may also be other parameters of the first schedule, such as a name of the first schedule, which will not be enumerated herein. Herein, the user may modify the parameter of the first schedule through the first schedule editing interface. The first schedule editing interface may be understood with reference to FIG. 2, which will not be repeated herein.

Regarding the parameter of the first schedule being modified, here are some examples.

The periodic schedule is a discussion conference specific to a project, which is carried out once a week. Schedule participants of the periodic schedule are participants of a project. Assuming that a new member is added to the project at a certain point of time (e.g., before the occurrence time of the first schedule), the user may add the new member as a schedule participant of the first schedule.

In some scenarios, the user may not have the need to modify the parameter of the multimedia conference associated with the first schedule when modifying the parameter of the first schedule. In this case, the user may not modify the parameter of the multimedia conference associated with the first schedule. Considering that the modification of the parameters (e.g., participants) of the first schedule may result in a change in the scope of information disclosure of items related to the periodic schedule, a conference link may be reassigned to the multimedia conference associated with the first schedule in order to protect the information security. Specifically:

when the parameter of the first schedule is modified and the parameter of the multimedia conference associated with the first schedule is unmodified, the client may obtain a second conference link of the multimedia conference associated with the first schedule, in response to the parameter of the first schedule in the periodic schedule being modified and the multimedia conference parameters associated with the first schedule being unmodified. The second conference link mentioned herein is different from the first conference link.

The specific implementation of the client to obtain the second conference link is similar to that of the client to obtain the first conference link, except that a triggering condition for obtaining the first conference link is different from that for obtaining the second conference link. The triggering condition for obtaining the first conference link is "a multimedia conference setting operation triggered by a user within a first schedule editing interface" mentioned in S101, while the triggering condition for obtaining the second conference link is "a parameter of the first schedule in the periodic schedule being modified, and a multimedia conference parameter associated with the first schedule being unmodified". The specific implementation for obtaining the second conference link may refer to the related description of obtaining the first conference link in the previous section, which will not be repeated herein.

In addition, in consideration of the first schedule in the periodic schedule, the user may hope the parameter of the multimedia conference associated with the first schedule be consistent with the parameter of the multimedia conference associated with a schedule in the periodic schedule in which parameter is unmodified. Therefore, the client may obtain a multimedia conference parameter corresponding to the second schedule in the periodic schedule, and the second schedule is any of the periodic schedules in which schedule parameters are unmodified; and the client may further save the second conference link and the multimedia conference parameters corresponding to the second schedule in association. Herein, the multimedia conference parameters associated with the second schedule refer to the parameter of the multimedia conference associated with the second schedule. In other words, if the user does not modify the parameter of the multimedia conference associated with the first schedule, the client may directly use the parameter of the multimedia conference associated with the second schedule as the parameter of the multimedia conference associated with the first schedule, thereby simplifying user operations while meeting user needs.

In one example, the multimedia conference parameter corresponding to the second schedule mentioned herein may be the first multimedia conference parameter. Certainly, if the user modifies the multimedia conference parameter corresponding to the periodic schedule before modifying the parameter of the first schedule, for example, modifies the multimedia conference parameter corresponding to the periodic schedule from the first multimedia conference parameter to the second multimedia conference parameter, the multimedia conference parameter corresponding to the second schedule may be the second multimedia conference parameter.

The user may determine an application scope of this modification when modifying the parameter of the first schedule. In one example, the modification to the parameter of the first schedule may be effective on at least one third schedule in the periodic schedule. For example, the modification to the parameter of the first schedule may be effective on all unexecuted schedules in the periodic schedule. For another example, the modification to the parameter of the first schedule may be effective on schedule in the periodic schedule that are executed after the first schedule. In another example, the modification to the parameter of the first schedule may be applicable only to the first schedule.

In one example, if the modification to the parameter of the first schedule may be effective on at least one third schedule in the periodic schedule, the scope of information disclosure for items associated with the first schedule is the same as that of information disclosure for item associated with the at least one third schedule. Therefore, in this case, a multimedia conference parameter corresponding to the at least one third schedule may be consistent with the multimedia conference parameter corresponding to the first schedule, and a multimedia conference link corresponding to the at least one third schedule may be consistent with the multimedia conference link corresponding to the first schedule. In other words, the client may save the second conference link and the multimedia conference parameters corresponding to the second schedule as the multimedia conference link and the multimedia conference parameter of the at least one third schedule in response to the modification to the parameter of the first schedule being effective on the at least one third schedule in the periodic schedule.

In one example, considering that, if the modification to the parameter of the first schedule is applicable only to the first schedule, it means that in the periodic schedule, the scope of information disclosure of the items associated with the first schedule has changed only, and the scope of information disclosure of items associated with further schedules in the periodic schedule has not changed. Therefore, in this case, the multimedia conference parameters and multimedia conference links of further schedules in the periodic schedule other than the first schedule are remained unchanged. In other words, the client may, in response to the modification to the parameter of the first schedule being applicable only to the first schedule, remain multimedia conference parameters and multimedia conference links of further schedules in the periodic schedule other than the first schedule unchanged. For example, the multimedia conference parameters of the further schedules may be remained as the first multimedia conference parameter, and the multimedia conference links of the further schedules may be remained as the first conference link. For another example, the multimedia conference parameters of the further schedules may be remained as the second multimedia conference parameter, and the multimedia conference links of the further schedules may be remained as the first conference link.

In some embodiments, when the schedule corresponding to the first schedule editing interface is the periodic schedule, the user may modify the parameter of a fourth schedule in the periodic schedule. The modified parameter of the fourth schedule are not specifically limited in the embodiments of the present application. The modified parameter of the fourth schedule may be schedule participants of the fourth schedule, and the modified parameter of the fourth schedule may also be other parameters of the fourth schedule, such as a name of the fourth schedule, which will not be enumerated herein. The user may modify the parameter of the fourth schedule through a second schedule editing interface. The second schedule editing interface may be understood with reference to FIG. 2, which will not be repeated herein.

In some scenarios, the user may set the parameter of the multimedia conference associated with the fourth schedule when modifying the parameter of the fourth schedule. Specifically, the user may trigger a multimedia conference setting operation in the second schedule editing interface. In addition, considering that the modification of participants of the fourth schedule may result in a change in the scope of information disclosure of items related to the periodic schedule, a conference link may be reassigned to a multimedia conference associated with the fourth schedule in order to protect the information security. Specifically, the client may obtain a third conference link in response to the multimedia conference setting operation triggered by the user in the second schedule editing interface. In addition, the client may display a third setting page in the second schedule editing interface. The third setting page may refer to the first setting page shown in FIG. 3, which will not be repeated herein.

The user may set the parameter of the multimedia conference associated with the fourth schedule in the third setting page. Correspondingly, the client may obtain third multimedia conference parameter input by the user in the third setting page. After completing the input of the third multimedia conference parameter in the third setting page, the user may trigger a saving operation in the third setting page. For example, the user may click a fourth control configured to trigger the saving operation in the third setting page. After the first user triggers the saving operation in the third setting page, the client may, in response to the saving operation triggered by the user in the third setting page, save the third multimedia conference parameter and the third conference link in association. Saving the third multimedia conference parameter and the third conference link in association refers to saving a corresponding relationship between the third multimedia conference parameters and the third conference link.

The third conference link mentioned here is different from the first conference link. The specific implementation of the client to obtain the third conference link is similar to the specific implementation of the client to obtain the first conference link, except that a triggering condition for obtaining the first conference link is different from that for obtaining the third conference link. The triggering condition for obtaining the first conference link is "a multimedia conference setting operation triggered by a user within a first schedule editing interface" mentioned in S101, while the triggering condition for obtaining the third conference link is "a multimedia conference setting operation triggered by a user within a second schedule editing interface". The specific implementation for obtaining the third conference link may refer to the related description of obtaining the first conference link in the previous section, which will not be repeated herein.

The user may determine an application scope of this modification when modifying the parameter of the fourth schedule. In one example, the modification to the parameter of the fourth schedule may be effective on at least one fifth schedule in the periodic schedule. For example, the modification to the parameter of the fourth schedule may be effective on all unexecuted schedules in the periodic schedule. For another example, the modification to the parameter of the fourth schedule may be effective on schedules in the periodic schedule that are executed after the fourth schedule. In yet another example, the modification to the parameter of the fourth schedule may be applicable only to the fourth schedule.

In one example, considering that the modification to the parameter of the fourth schedule may be effective on the at least one fifth schedule in the periodic schedule, the scope of information disclosure for items associated with the fourth schedule is the same as that of information disclosure for items associated with the at least one fifth schedule. Therefore, in this case, multimedia conference parameters corresponding to the at least one fifth schedule may be consistent with the multimedia conference parameters corresponding to the fourth schedule, and the multimedia conference link corresponding to the at least one fifth schedule may be consistent with that corresponding to the fourth schedule. In other words, the client may associate and save the third conference link and the third multimedia conference parameters as the multimedia conference link and multimedia conference parameters of the at least one fifth schedule in response to the modification to the parameter of the fourth schedule being effective on the at least one fifth schedule in the periodic schedule.

In one example, considering that, if the modification to the parameter of the fourth schedule is applicable only to the fourth schedule, it means that in the periodic schedule, the scope of information disclosure of the items associated with the fourth schedule is changed only, and the scope of information disclosure of items associated with further schedules in the periodic schedule is not changed. Therefore, in this case, the multimedia conference parameters and multimedia conference links of further schedules in the periodic schedule other than the fourth schedule are remained unchanged. In other words, the client may, in response to the modification to the parameter of the fourth schedule being only applicable to the fourth schedule, remain the multimedia conference parameters and multimedia conference links of further schedules in the periodic schedule other than the fourth schedule unchanged. For example, the multimedia conference parameters of the further schedules may be remained as the first multimedia conference parameter, and the multimedia conference links of the further schedules may be remained as the first conference link. For another example, the multimedia conference parameters of the further schedules may be remained as the second multimedia conference parameter, and the multimedia conference links of the further schedules may be remained as the first conference link.

In an example, for a schedule such as the first schedule, after the first schedule has been created and the parameter of the multimedia conference associated with the first schedule are configured, participants of the first schedule may initiate or enter the multimedia conference associated with the first schedule on a schedule page of the first schedule. The participants of the first schedule comprise a creator of the first schedule and other participants of the first schedule. The participant of the first schedule may trigger an operation to enter a schedule interface of the first schedule through a calendar interface.

Figure 4A:
FIG. 4a is a schematic diagram of a schedule page according to an embodiment of the present application.
Figure 4B:
FIG. 4b is a schematic diagram of a schedule page according to an embodiment of the present application.

Referring to FIGS. 4a and 4b, FIGS. 4a and 4b are schematic diagrams of the schedule page provided for an embodiment of the present application.

When the multimedia conference associated with the first schedule has not been created, the schedule interface of the first schedule is shown in FIG. 4a, and the user may initiate the multimedia conference associated with the first schedule by clicking "Initiate A Conference" shown in FIG. 4a.

When the multimedia conference associated with the first schedule has begun, the schedule interface of the first schedule is shown in FIG. 4b, and the user may enter the multimedia conference associated with the first schedule by clicking "Enter A Conference" shown in FIG. 4b.

"..**" shown in FIGS. 4a and 4b indicates a multimedia conference link of a multimedia conference associated with the first schedule.

The schedule interface of the first schedule may also comprise other content, which is indicated by "****" in FIGS. 4a and 4b. In addition, FIGS. 4a and 4b are shown for ease of understanding only and do not constitute a limitation of the schedule interface.

Exemplary Device

Based on the method provided by the above embodiments, an embodiment of the present application further provides an apparatus, which is described below in conjunction with the accompanying drawings.

Figure 5:
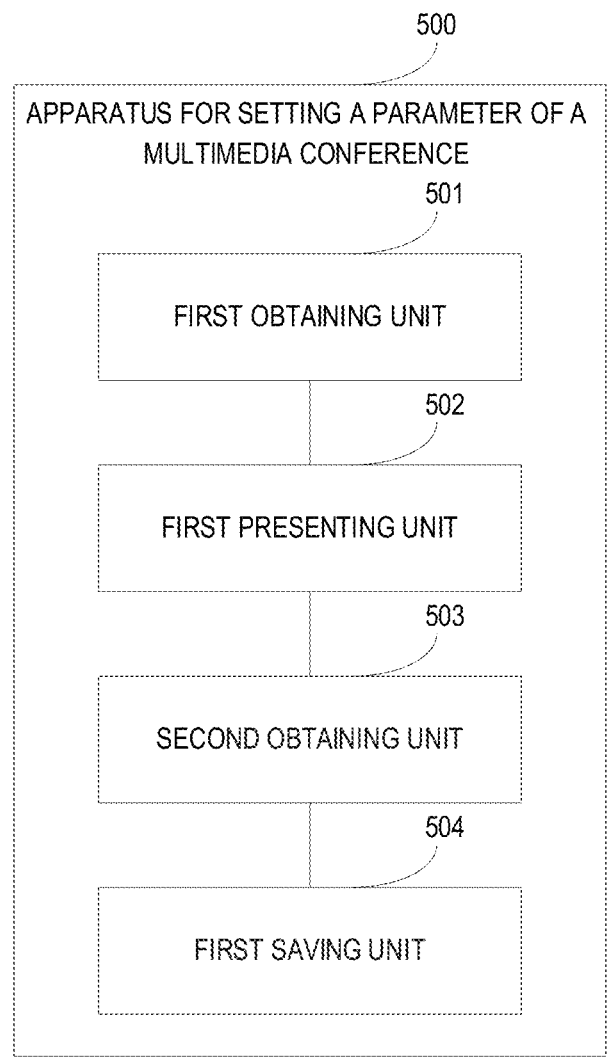
FIG. 5 is a schematic structural diagram of an apparatus for setting a parameter of a multimedia conference according to an embodiment of the present application.

Referring to FIG. 5, which shows a schematic structure of an apparatus for setting a parameter of a multimedia conference, provided by embodiments of the present application. The apparatus 500 may, for example, specifically comprise: a first obtaining unit 501, a first presenting unit 502, a second obtaining unit 503 and a first saving unit 504.

A first obtaining unit 501 is configured to, in response to a multimedia conference setting operation triggered by a user within a first schedule editing interface, obtain a first conference link of a multimedia conference.

A first presenting unit 502 is configured to, in response to the multimedia conference setting operation, present a first setting page within the first schedule editing interface, the multimedia conference being a multimedia conference associated with the schedule corresponding to the first schedule editing interface, and the first setting page being for setting a parameter of the multimedia conference, the first schedule editing interface being an editing interface related to a schedule.

A second obtaining unit 503 is configured to obtain a first multimedia conference parameter input by the user within the first setting page.

A first saving unit 504 is configured to, in response to a saving operation triggered by the user within the first setting page, save the first multimedia conference parameter in association with the first conference link in association.

Optionally, the first obtaining unit 501 is configured to: in response to the multimedia conference setting operation, send, by a schedule module, a conference link assignment request to a multimedia conference module; and obtain the first conference link assigned by the multimedia conference module to the multimedia conference.

Optionally, the apparatus further comprises: a second presenting unit configured to present a second setting page in response to a multimedia conference setting operation triggered by the user for a created schedule, the second setting page comprising the first multimedia conference parameter, the created schedule being a schedule corresponding to the first schedule editing page; a third obtaining unit configured to obtain a modified parameter in response to a modification operation triggered by the user for at least one parameter of the first multimedia conference parameter that is presented within the second setting page; and a second saving unit configured to, in response to a saving operation triggered by the user within the second setting page, save a second multimedia conference parameter and the first conference link in association, the second multimedia conference parameter comprising the modified parameter, and an unmodified parameter in the first multimedia conference parameter.

Optionally, a schedule corresponding to the first schedule editing interface is a periodic schedule, the apparatus further comprising: a fourth obtaining unit configured to obtain a second conference link of a multimedia conference associated with a first schedule, in response to a parameter of the first schedule in the periodic schedule being modified, and a multimedia conference parameter associated with the first schedule being unmodified; a fifth obtaining unit configured to obtain a multimedia conference parameter corresponding to a second schedule in the periodic schedule, the second schedule being any one of periodic schedules whose schedule parameter is unmodified; and a third saving unit configured to save the second conference link in association with the multimedia conference parameter corresponding to the second schedule.

Optionally, the multimedia conference parameter corresponding to the second schedule is the first multimedia conference parameter.

Optionally, the apparatus further comprises: a fourth saving unit configured to, in response to the modification to the parameter of the first schedule being effective on at least one third schedule in the periodic schedule, save the second conference link and the multimedia conference parameter corresponding to the second schedule as a multimedia conference link and a multimedia conference parameter of the at least one third schedule.

Optionally, the apparatus further comprises: a first remaining unit configured to, in response to the modification to the parameter of the first schedule being applicable only to the first schedule, remain multimedia conference parameters and multimedia conference links of further schedules in the periodic schedule other than the first schedule unchanged.

Optionally, the modified parameter of the first schedule comprises: a schedule participant of the first schedule.

Optionally, a schedule corresponding to the first schedule editing interface is a periodic schedule, the apparatus further comprising: a sixth obtaining unit configured to, in response to a multimedia conference setting operation triggered by a user within a second schedule editing interface, obtain a third conference link; a third presenting unit configured to, in response to a multimedia conference setting operation triggered by a user within a second schedule editing interface, present a third setting page within the second schedule editing interface, wherein the second schedule editing interface is an editing interface of a fourth schedule in the periodic schedule, the user modifying a parameter of the fourth schedule via the second schedule editing interface, the third conference link being a link of a multimedia conference associated with the fourth schedule; a seventh obtaining unit configured to obtain a third multimedia conference parameter input by the user within the third setting page; and a fifth saving unit configured to, in response to a saving operation triggered by the user within the third setting page, save the third multimedia conference parameter in association with the third conference link.

Optionally, the apparatus further comprises: a sixth saving unit configured to, in response to the modification to the parameter of the fourth schedule being effective on at least one fifth schedule in the periodic schedule, save the third multimedia conference parameter and the third conference link as a multimedia conference parameter and a multimedia conference link of the at least one fifth schedule in association.

Optionally, the apparatus further comprises: a second remaining unit configured to, in response to the modification to the parameter of the fourth schedule being applicable only to the fourth schedule, remain multimedia conference parameters and multimedia conference links of further schedules in the periodic schedule other than the fourth schedule unchanged.

Optionally, the first schedule editing interface is for creating a schedule, or the first schedule editing interface is an editing interface for a created schedule.

Optionally, the apparatus further comprises: a fourth presenting unit configured to present, within a schedule interface, schedule information that has been edited and completed within the first schedule editing interface.

Since the apparatus 500 is an apparatus corresponding to the method provided by the above method embodiments, the specific implementation of the respective units of the apparatus 500 is of the same concept as the above method embodiments. Therefore, the specific implementation of the respective units of the apparatus 500 may refer to the description of the above method embodiments and will not be repeated herein.

An embodiment of the present application provides a device, comprising a processor and a memory.

The processor is configured to execute instructions stored in the memory, causing the device to implement the method of the above method embodiments.

An embodiment of the present application provides a computer-readable storage medium, comprising instructions, the instruction instructing a device to implement the method of any of the above embodiments.

An embodiment of the present application provides a computer program product, wherein the computer program product, when executed on a computer, causes a computer to implement the method of any of the above method embodiments.

Other embodiments of the present application will be apparent to those skilled in the art from consideration of the specification and practice of the present disclosure herein. The present application is intended to cover any variations, uses, or adaptive changes of the present application, following the general principles of the present application and comprising common knowledge or commonly used technical measures which are not disclosed herein. The specification and embodiments are to be considered as exemplary only, and the true scope and spirit of the present disclosure are indicated by the following claims.

It will be appreciated that the present application is not limited to the exact construction that has been described above and illustrated in the accompanying drawings, and that various modifications and changes can be made without departing from the scope thereof. It is intended that the scope of the present application is only limited by the appended claims.

The foregoing descriptions are merely preferred embodiments of the present application and are not intended to limit the present application. Within the spirit and principles of the present application, any modifications, equivalent substitutions, improvements and the like are within the protection scope of the present application.

The invention claimed is:

1. A method of setting a parameter of a multimedia conference, comprising:

in response to a multimedia conference setting operation triggered by a user within a first schedule editing interface, obtaining a first conference link of the multimedia conference and presenting a first setting page within the first schedule editing interface, the multimedia conference being a multimedia conference associated with a schedule corresponding to the first schedule editing interface, and the first setting page being for setting a parameter of the multimedia conference, the first schedule editing interface being an editing interface related to a schedule;

obtaining a first multimedia conference parameter input by the user within the first setting page;

in response to a saving operation triggered by the user within the first setting page, saving the first multimedia conference parameter in association with the first conference link;

wherein a schedule corresponding to the first schedule editing interface is a periodic schedule, and wherein the method further comprises:

obtaining a second conference link of a multimedia conference associated with a first schedule, in response to a parameter of the first schedule in the periodic schedule being modified, and a multimedia conference parameter associated with the first schedule being unmodified;

obtaining a multimedia conference parameter corresponding to a second schedule in the periodic schedule, the second schedule being any one of periodic schedules whose schedule parameter is unmodified; and saving the second conference link in association with the multimedia conference parameter corresponding to the second schedule.

2. The method of claim 1, wherein in response to the multimedia conference setting operation, obtaining a first conference link of the multimedia conference comprises:

in response to the multimedia conference setting operation, sending, by a schedule module, a conference link assignment request to a multimedia conference module; and obtaining the first conference link assigned by the multimedia conference module to the multimedia conference.

3. The method of claim 1, further comprising:

presenting a second setting page in response to a multimedia conference setting operation triggered by the user for a created schedule, the second setting page comprising the first multimedia conference parameter, the created schedule being a schedule corresponding to the first schedule editing page;

obtaining a modified parameter in response to a modification operation triggered by the user for at least one parameter of the first multimedia conference parameter that is presented within the second setting page; and in response to a saving operation triggered by the user within the second setting page, saving a second multimedia conference parameter and the first conference link in association, the second multimedia conference parameter comprising the modified parameter.

4. The method of claim 1, wherein the multimedia conference parameter corresponding to the second schedule is the first multimedia conference parameter.

5. The method of claim 1, further comprising:

in response to the modification to the parameter of the first schedule being effective on at least one third schedule in the periodic schedule, saving the second conference link and the multimedia conference parameter corresponding to the second schedule as a multimedia conference link and a multimedia conference parameter of the at least one third schedule.

6. The method of claim 1, further comprising:

in response to the modification to the parameter of the first schedule being applicable only to the first schedule, remaining multimedia conference parameters and multimedia conference links of further schedules in the periodic schedule other than the first schedule unchanged.

7. The method of claim 1, wherein the modified parameter of the first schedule comprises:

a schedule participant of the first schedule.

8. The method of claim 1, wherein a schedule corresponding to the first schedule editing interface is a periodic schedule, the method further comprising:

in response to a multimedia conference setting operation triggered by a user within a second schedule editing interface, obtaining a third conference link and presenting a third setting page within the second schedule editing interface, wherein the second schedule editing interface is an editing interface of a fourth schedule in the periodic schedule, the user modifying a parameter of the fourth schedule via the second schedule editing interface, the third conference link being a link of a multimedia conference associated with the fourth schedule;

obtaining a third multimedia conference parameter input by the user within the third setting page; and in response to a saving operation triggered by the user within the third setting page, saving the third multimedia conference parameter in association with the third conference link.

9. The method of claim 8, further comprising:

in response to the modification to the parameter of the fourth schedule being effective on at least one fifth schedule in the periodic schedule, saving the third multimedia conference parameter and the third conference link as a multimedia conference parameter and a multimedia conference link of the at least one fifth schedule in association.

10. The method of claim 8, further comprising:

in response to the modification to the parameter of the fourth schedule being applicable only to the fourth schedule, remaining multimedia conference parameters and multimedia conference links of further schedules in the periodic schedule other than the fourth schedule unchanged.

11. The method of claim 1, wherein the first schedule editing interface is for creating a schedule, or the first schedule editing interface is an editing interface for a created schedule.

12. The method of claim 1, further comprising:

presenting, within a schedule interface, schedule information that has been edited and completed within the first schedule editing interface.

13. A device, comprising a processor and a memory;

the processor being configured to execute instructions stored in the memory, causing the device to implement acts comprising:

in response to a multimedia conference setting operation triggered by a user within a first schedule editing interface, obtaining a first conference link of the multimedia conference and presenting a first setting page within the first schedule editing interface, the multimedia conference being a multimedia conference associated with a schedule corresponding to the first schedule editing interface, and the first setting page being for setting a parameter of the multimedia conference, the first schedule editing interface being an editing interface related to a schedule;

obtaining a first multimedia conference parameter input by the user within the first setting page;

in response to a saving operation triggered by the user within the first setting page, saving the first multimedia conference parameter in association with the first conference link;

wherein a schedule corresponding to the first schedule editing interface is a periodic schedule, and wherein the acts further comprise:

obtaining a second conference link of a multimedia conference associated with a first schedule, in response to a parameter of the first schedule in the periodic schedule being modified, and a multimedia conference parameter associated with the first schedule being unmodified;

obtaining a multimedia conference parameter corresponding to a second schedule in the periodic schedule, the second schedule being any one of periodic schedules whose schedule parameter is unmodified; and saving the second conference link in association with the multimedia conference parameter corresponding to the second schedule.

14. The device of claim 13, wherein in response to the multimedia conference setting operation, obtaining a first conference link of the multimedia conference comprises:
in response to the multimedia conference setting operation, sending, by a schedule module, a conference link assignment request to a multimedia conference module; and
obtaining the first conference link assigned by the multimedia conference module to the multimedia conference.

15. The device of claim 13, wherein the acts further comprise:
presenting a second setting page in response to a multimedia conference setting operation triggered by the user for a created schedule, the second setting page comprising the first multimedia conference parameter, the created schedule being a schedule corresponding to the first schedule editing page;
obtaining a modified parameter in response to a modification operation triggered by the user for at least one parameter of the first multimedia conference parameter that is presented within the second setting page; and
in response to a saving operation triggered by the user within the second setting page, saving a second multimedia conference parameter and the first conference link in association, the second multimedia conference parameter comprising the modified parameter.

16. The device of claim 13, wherein the multimedia conference parameter corresponding to the second schedule is the first multimedia conference parameter.

17. The device of claim 13, wherein the acts further comprise:
in response to the modification to the parameter of the first schedule being effective on at least one third schedule in the periodic schedule, saving the second conference link and the multimedia conference parameter corresponding to the second schedule as a multimedia conference link and a multimedia conference parameter of the at least one third schedule.

18. A non-transitory computer-readable storage medium, comprising instructions, the instructions upon execution by a device cause the device to implement acts comprising:
in response to a multimedia conference setting operation triggered by a user within a first schedule editing interface, obtaining a first conference link of the multimedia conference and presenting a first setting page within the first schedule editing interface, the multimedia conference being a multimedia conference associated with a schedule corresponding to the first schedule editing interface, and the first setting page being for setting a parameter of the multimedia conference, the first schedule editing interface being an editing interface related to a schedule;
obtaining a first multimedia conference parameter input by the user within the first setting page; and
in response to a saving operation triggered by the user within the first setting page, saving the first multimedia conference parameter in association with the first conference link;
wherein a schedule corresponding to the first schedule editing interface is a periodic schedule, and wherein the acts further comprise:
obtaining a second conference link of a multimedia conference associated with a first schedule, in response to a parameter of the first schedule in the periodic schedule being modified, and a multimedia conference parameter associated with the first schedule being unmodified;
obtaining a multimedia conference parameter corresponding to a second schedule in the periodic schedule, the second schedule being any one of periodic schedules whose schedule parameter is unmodified; and
saving the second conference link in association with the multimedia conference parameter corresponding to the second schedule.

19. The non-transitory computer-readable storage medium of claim 18, the acts further comprising:
presenting a second setting page in response to a multimedia conference setting operation triggered by the user for a created schedule, the second setting page comprising the first multimedia conference parameter, the created schedule being a schedule corresponding to the first schedule editing page;
obtaining a modified parameter in response to a modification operation triggered by the user for at least one parameter of the first multimedia conference parameter that is presented within the second setting page; and
in response to a saving operation triggered by the user within the second setting page, saving a second multimedia conference parameter and the first conference link in association, the second multimedia conference parameter comprising the modified parameter.

20. The non-transitory computer-readable storage medium of claim 18, wherein a schedule corresponding to the first schedule editing interface is a periodic schedule, and wherein the acts further comprise:
in response to a multimedia conference setting operation triggered by a user within a second schedule editing interface, obtaining a third conference link and presenting a third setting page within the second schedule editing interface, wherein the second schedule editing interface is an editing interface of a fourth schedule in the periodic schedule, the user modifying a parameter of the fourth schedule via the second schedule editing interface, the third conference link being a link of a multimedia conference associated with the fourth schedule;
obtaining a third multimedia conference parameter input by the user within the third setting page; and
in response to a saving operation triggered by the user within the third setting page, saving the third multimedia conference parameter in association with the third conference link.

* * * * *